UNITED STATES PATENT OFFICE.

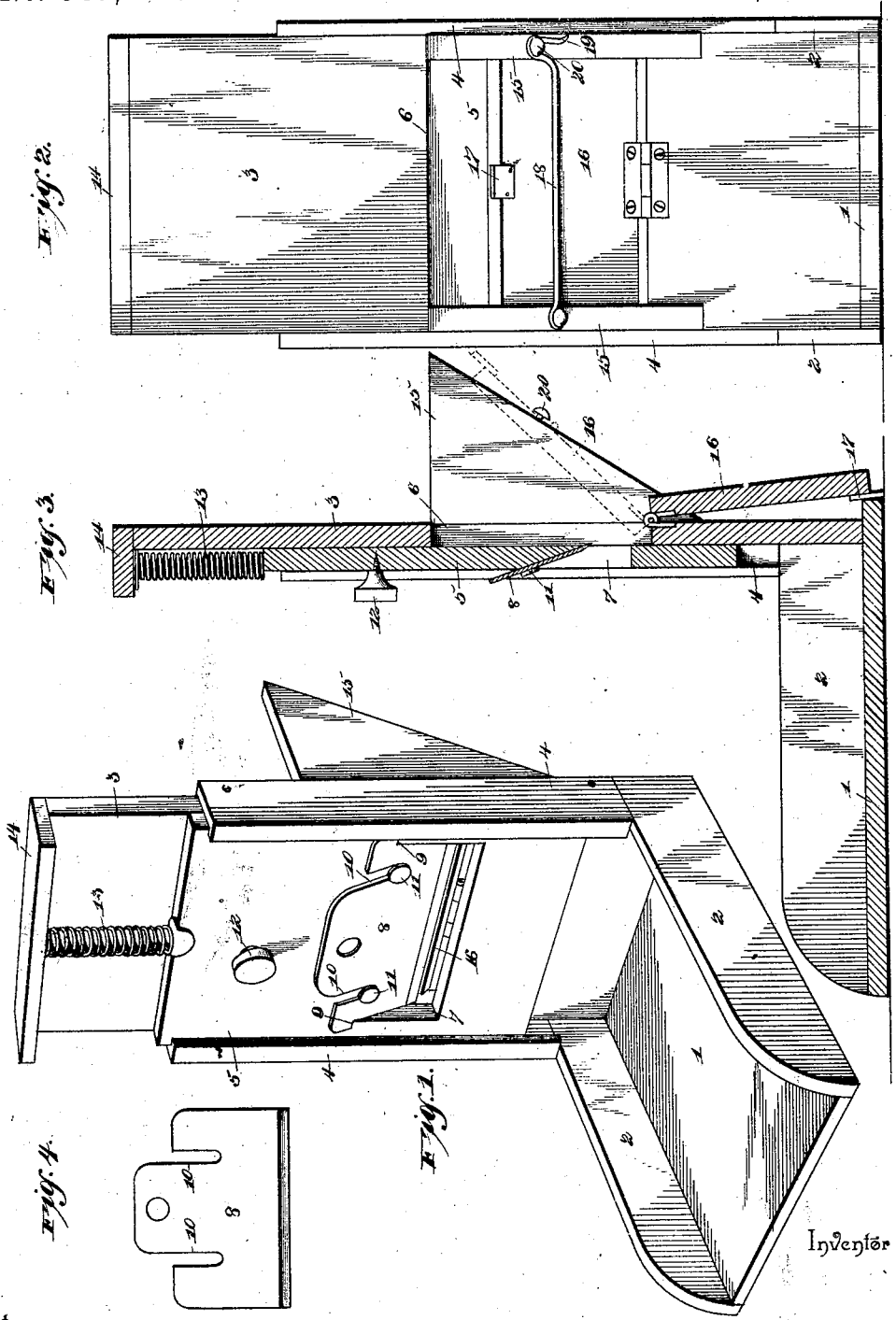

HIRAM Q. HOOD, OF WEBB CITY, MISSOURI, ASSIGNOR OF ONE-HALF TO V. G. HAGAMAN, OF SAME PLACE.

MEAT OR VEGETABLE SLICER.

SPECIFICATION forming part of Letters Patent No. 547,014, dated October 1, 1895.

Application filed January 31, 1895. Serial No. 536,814. (No model.)

*To all whom it may concern:*

Be it known that I, HIRAM Q. HOOD, a citizen of the United States, residing at Webb City, in the county of Jasper and State of Missouri, have invented a new and useful Fruit, Meat, and Vegetable Slicer, of which the following is a specification.

The invention relates to improvements in fruit, meat, and vegetable slicers.

The object of the present invention is to provide a simple, inexpensive, and efficient device adapted for slicing various kinds of fruits, vegetables, and meats and for shaving ice, and capable of being adjusted to cut the slices the desired thickness, and adapted to be arranged to accommodate the various articles to be sliced.

The invention consists in the construction and novel combination and arrangement of parts hereinafter fully described, illustrated in the accompanying drawings, and pointed out in the claim hereto appended.

In the drawings, Figure 1 is a perspective view of a meat and vegetable slicer constructed in accordance with this invention. Fig. 2 is a rear elevation of the same. Fig. 3 is a vertical longitudinal sectional view, the hinged back of the hopper being lowered. Fig. 4 is a detail view of the knife.

Like numerals of reference indicate like parts in all the figures of the drawings.

1 designates a base, provided with sides 2 and forming a receptacle for the slices, and rising from one end of the base is a standard 3, provided at opposite sides with vertical bars 4, forming ways for a reciprocating knife-carrying slide 5. The standard and the base form a supporting-frame, and the former is provided with a rectangular opening 6 and the side pieces 4 are provided with grooves to receive the edges of the slide 5, and the latter has an opening 7, at the top of which is adjustably secured an inclined knife 8.

The reciprocating slide has the upper edge of its opening 7 beveled and is provided at the terminals thereof with grooves or kerfs 9 to receive the side edges of the knife 8, and the latter is provided with slots 10, that are engaged by screws 11, and is adapted to be adjusted vertically or upwardly and downwardly to vary the thickness of the cut and thereby regulate the slices. A handle or knob 12 is mounted on the slide for the convenience of the operator, and the slide is assisted in its upward movement by a spring 13, having its lower end attached to the slide and its upper end secured to a top piece or cap 14, mounted at the upper end of the standard. This construction permits the slide to be rapidly reciprocated and the slices are evenly and uniformly cut.

At the back of the standard is arranged a tapering hopper composed of inverted triangular sides 15 and a swinging back 16, hinged at its lower edge at the bottom of the opening 6 of the standard, and adapted to be adjusted or moved inward and outward to accommodate the hopper to the character of the article to be sliced and to create the desired pressure and to advance the substance being cut. The adjustable back 16 is provided at its top with a projection 17 to limit the inward swing of the back. The back is supported in an inclined position by a transverse rod 18, hinged at one side of the hopper and terminating in a hook 19, adapted to engage a headed stud 20. The other end of the transverse rod is provided with an eye to receive a fastening device for pivoting or hinging it to one of the sides 15.

It will be seen that the slicer is exceedingly simple and inexpensive in construction, that it is adapted for slicing all kinds of meats and vegetables usually cut in slices, and fruits, sauer-kraut, and the like, and for shaving ice. It will also be apparent that the adjustable back of the hopper is adapted to be swung downward to free the opening of the standard to permit any article to be cut that cannot be conveniently introduced into the hopper. It will also be seen that the knife is adjustable to regulate the thickness of the slices. Furthermore, the adjustable back is adapted to be swung inward to force a substance to be sliced against the knife.

Changes in the form, proportion, and the minor details of construction may be resorted to without departing from the principle or sacrificing any of the advantages of this invention.

What I claim is—

A slicer, comprising a supporting frame, a vertically reciprocating knife, the parallel hopper sides fixed to the frame, and the adjustable back hinged at its lower edge to the frame and arranged between the sides of the hopper and adapted to be held at an inclination to cause a self feed, and capable of being lowered and of being swung inward toward the frame to force a substance to be sliced against the knife, substantially as described.

In testimony that I claim the foregoing as my own I have hereto affixed my signature in the presence of two witnesses.

HIRAM Q. HOOD.

Witnesses:
 T. A. LANE,
 WM. KERR.